(12) United States Patent
Iwamoto et al.

(10) Patent No.: US 7,894,181 B2
(45) Date of Patent: Feb. 22, 2011

(54) PORTABLE INFORMATION PROCESSOR, HOUSING OF PORTABLE INFORMATION PROCESSOR, AND METHOD FOR MANUFACTURING THE HOUSING

(75) Inventors: Akira Iwamoto, Osaka (JP); Jun Sato, Osaka (JP); Isao Shimada, Hyogo (JP); Atsushi Murase, Osaka (JP)

(73) Assignee: Panasonic Corporation, Osaka (JP)

( * ) Notice: Subject to any disclaimer, the term of this patent is extended or adjusted under 35 U.S.C. 154(b) by 722 days.

(21) Appl. No.: 11/624,880

(22) Filed: Jan. 19, 2007

(65) Prior Publication Data

US 2008/0024965 A1 Jan. 31, 2008

(30) Foreign Application Priority Data

Mar. 31, 2006 (JP) ............................. 2006-098821

(51) Int. Cl.
*H05K 5/03* (2006.01)
(52) U.S. Cl. ..................... 361/679.21; 361/679.09; 361/679.26; 361/679.55; 248/917; 349/58
(58) Field of Classification Search .............. 361/683, 361/679.09, 679.21, 679.26, 679.55, 679.56, 361/679.02; 248/917; 349/58
See application file for complete search history.

(56) References Cited

U.S. PATENT DOCUMENTS

| 4,890,471 | A | * | 1/1990 | Ito | 72/348 |
|---|---|---|---|---|---|
| D353,133 | S | * | 12/1994 | Yamada et al. | D14/106 |
| 5,706,168 | A | * | 1/1998 | Erler et al. | 361/679.34 |
| 6,262,886 | B1 | * | 7/2001 | DiFonzo et al. | 361/683 |
| 6,819,547 | B2 | * | 11/2004 | Minaguchi et al. | 361/679.01 |
| 7,224,580 | B2 | * | 5/2007 | Shimada et al. | 361/679.27 |
| 7,440,264 | B2 | * | 10/2008 | Lam et al. | 361/681 |
| 7,535,698 | B2 | * | 5/2009 | Iwamoto et al. | 361/679.55 |
| 2007/0041149 | A1 | * | 2/2007 | Homer et al. | 361/681 |

FOREIGN PATENT DOCUMENTS

| JP | 9-62400 A | 3/1997 |
|---|---|---|
| JP | 2003-204174 A | 7/2003 |

* cited by examiner

*Primary Examiner*—Jayprakash N Gandhi
*Assistant Examiner*—Ingrid Wright
(74) *Attorney, Agent, or Firm*—RatnerPrestia

(57) ABSTRACT

The rear housing composing the display portion includes a raised portion and a non-raised portion with a level difference therebetween. The rear housing of the display portion is formed in such a manner that the non-raised portion has a cylindrically curved surface and that the level difference has an edge line at right angles with the lateral line of the cylindrically curved surface. The rear housing has such an automobile hood structure with a partially raised surface, thereby being prevented from being deformed due to external pressure not only in its width direction but also in its longitudinal direction.

9 Claims, 5 Drawing Sheets

PORTABLE INFORMATION PROCESSOR, HOUSING OF PORTABLE INFORMATION PROCESSOR, AND METHOD FOR MANUFACTURING THE HOUSING

BACKGROUND OF THE INVENTION

1. Field of the Invention

The present invention relates to portable information processors such as notebook personal computers, and more particularly to a portable information processor, a metal housing of the portable information processor, and a method for manufacturing the housing.

2. Background Art

In recent years, portable information processors (hereinafter, collectively referred to as notebook PCs) are becoming increasingly low-profile and lightweight to improve portability. This means that the housings of the notebook PCs are also becoming increasingly low-profile. On the other hand, more and more housings are made of metal to improve their mechanical strength and to effectively radiate heat generated from the electromagnetic shield or inside the notebook PCs.

A conventional notebook PC is described as follows with reference to drawings.

FIG. 4A is an external perspective view of the conventional notebook PC when the display portion is in the closed state. FIG. 4B is a sectional view of the display portion of FIG. 4A when viewed from axis 4B-4B. FIG. 4C is a sectional view of the display portion of FIG. 4A when viewed from axis 4C-4C.

The notebook PC shown in FIGS. 4A-4C includes, between rear housing 24 and front housing 25, a liquid crystal drive circuit (unillustrated) and liquid crystal display panel 26, which are components of a liquid crystal display device.

The conventional portable information processor thus structured is described in detail as follows.

In general, a notebook PC, which is also called a book PC, has a flat box shape with nearly rectangular flat portions when the display portion is in the closed state, so that it can be easily carried in a bag or the like.

Rear housing 24 is made of a metal material such as aluminum to improve the mechanical strength and to effectively radiate heat generated from the electromagnetic shield or inside the notebook PC. Especially in recent years, further weight reduction has been made by replacing aluminum with a magnesium alloy having a smaller specific gravity and a higher strength than aluminum, thereby making the housing as thin as possible.

The reduction of the housing in thickness and weight has allowed notebook PCs to be carried in a bag or the like more often than before. However, in a crowded train or similar situations, a high pressure can be applied from outside to display portion 22 in the bag. This may deform thin rear housing 24 and damage liquid crystal display panel 26 stored inside. To avoid this from happening, as shown in FIG. 4B, rear housing 24 is mechanically reinforced by raising its center portion in the longitudinal direction like an automobile hood while maintaining its basic thickness. This technique is disclosed, for example, in Japanese Patent Unexamined Publications No. H09-062400 and No. 2003-204174.

In the aforementioned conventional structure shown in FIGS. 4A, 4B, and 4C, rear housing 24 is resistant to bending in its width direction (axis 4B-4B) shown by the dotted arrows, but becomes less resistant closer to the center in its longitudinal direction (axis 4C-4C) shown by the solid arrows because of being supported only by its frame and the edge line of the raised portion (within the dotted circle of FIG. 4B).

The following is a description of the procedure of manufacturing the rear housing by press forming.

FIG. 5 shows the method of manufacturing the rear housing by press forming. As shown in FIG. 5, planar material 51 made of a magnesium alloy is placed between blank holder 52 and die set 53 and then press-molded with punch 55 while being heated with heaters 54.

When rear housing 24 of display portion 22 is press-formed to provide a raised portion, the edge line has material distortion, causing the raised portion to have an irregular surface. In the case of being made of a magnesium alloy, planar material 51 is generally press-formed at high temperatures of 200° C. or higher in order to avoid cracks caused by bending the material. During the press forming, the magnesium alloy thermally expands too much to make the surface of the raised portion flat, and the excess portion of the surface makes the surface irregular.

For easier understanding, the sectional view of rear housing 24 is shown in an exaggerated form in FIG. 5; however, the actual level difference between the raised portion and the other portion is only about ±0.5 mm. Even so, such irregularities on the surface of rear housing 24 spoil the appearance. Not only that, the protrusions on the surface can be turned inside out by a slight external force and become depressions, thereby losing the tension of the surface and greatly reducing the strength of the surface.

FIG. 6 shows a process where a rear housing shaped by casting is cooled and shrunk. In the case where rear housing 24 is cast using a casting mold, it shrinks at different rates in different portions while being cooled as shown in FIG. 6. This particularly affects the flat surface of the raised portion of rear housing 24 and makes it irregular.

Similar to FIG. 5, in FIG. 6, the sectional view of rear housing is shown in an exaggerated form for easier understanding; however, the actual level difference between the raised portion and the other portion is only about ±0.5 mm. Even so, such irregularities on the surface of rear housing 24 spoil the appearance. Not only that, the protrusions on the surface can be turned inside out by a slight external force and become depressions, thereby losing the tension of the surface and greatly reducing the strength of the surface.

SUMMARY OF THE INVENTION

The present invention provides a housing of a notebook PC that includes a rear housing to cover the display portion of the notebook PC, the rear housing being lightweight and resistant to external forces. The invention further provides the structure of a housing of a notebook PC that can maintain the formability of the rear housing when shaped as a metal mold.

The housing of the present invention is used for a portable information processor that includes a display portion and a main body. The display portion composes a rear housing which includes a raised portion and a non-raised portion with a level difference therebetween. At least one of the raised portion and the non-raised portion has a cylindrically curved surface, and the level difference has an edge line at right angles with the lateral line of the cylindrical surface.

The rear housing covering the display portion of the notebook PC has a so-called "automobile hood structure" with a partially raised surface. The structure allows the rear housing to be resistant to deformation by external pressure in its width direction and to have an improved resistance to deformation in its longitudinal direction.

DETAILED DESCRIPTION OF THE INVENTION

An embodiment of the present invention is described as follows with reference to FIG. 1A to FIG. 2C.

Figure 1A:
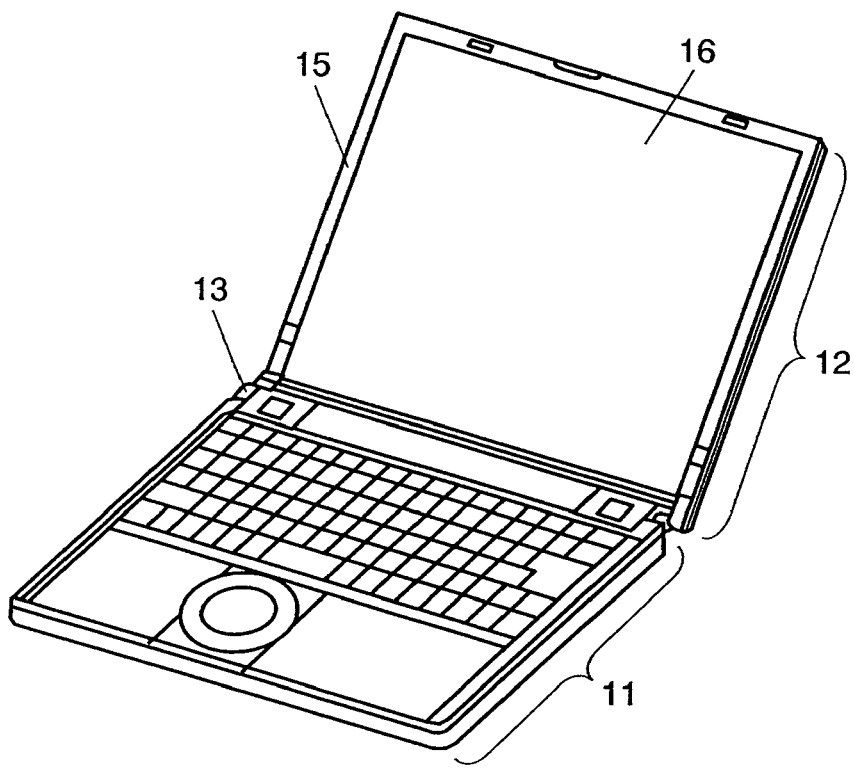
FIG. 1A is a perspective view of a notebook PC having a housing of a portable information processor according to the present invention when the display portion is in the open state.
Figure 1B:
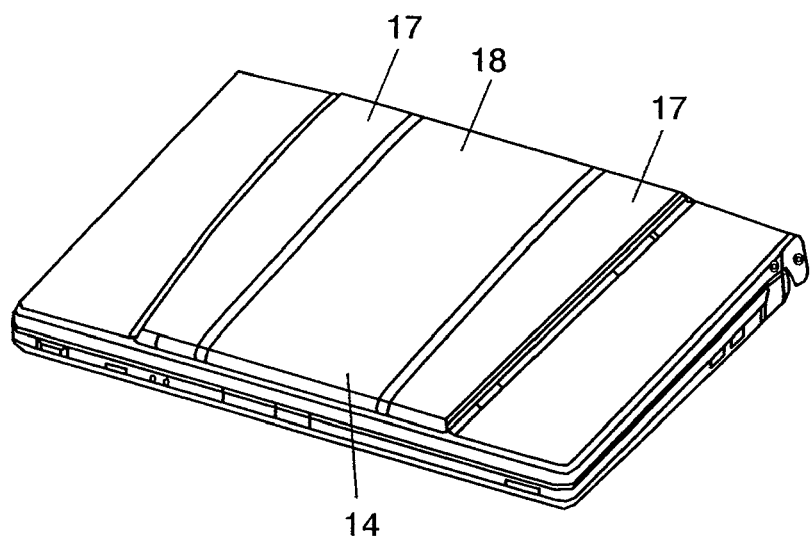
FIG. 1B is a perspective view of the notebook PC having the housing of the portable information processor according to the present invention when the display portion is in the closed state.
Figure 2A:
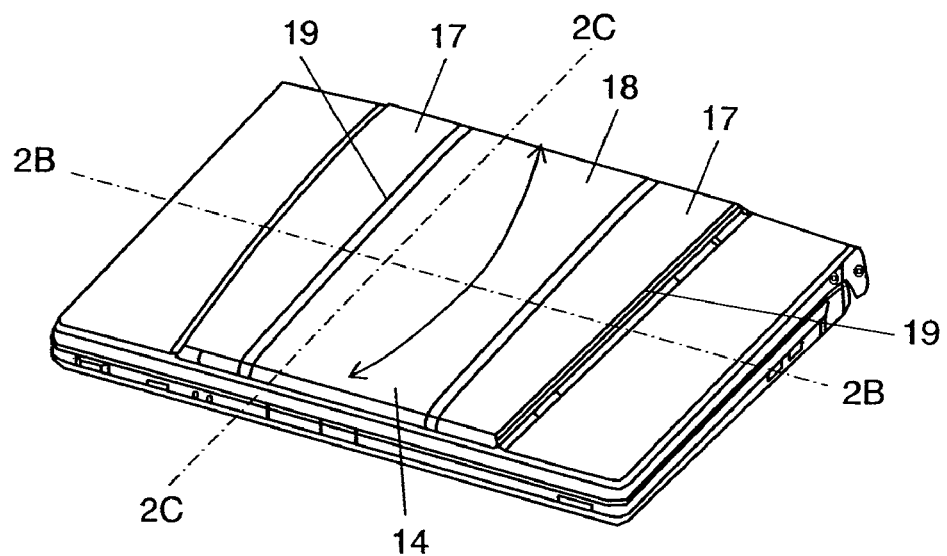
FIG. 2A is another perspective view of the notebook PC having the housing of the portable information processor according to the present invention when the display portion is in the closed state.
Figure 2B:
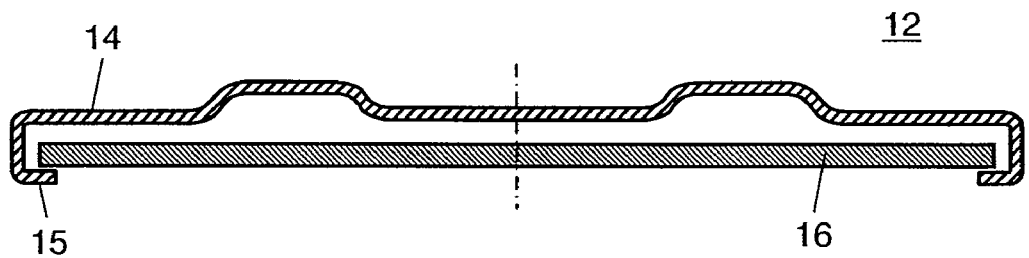
FIG. 2B is a sectional view of the display portion of the notebook PC taken along axis 2B-2B of FIG. 2A.
Figure 2C:
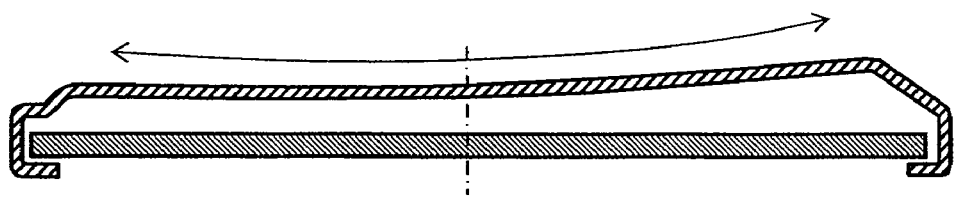
FIG. 2C is a sectional view of the display portion of the notebook PC taken along axis 2C-2C of FIG. 2A.

FIGS. 1A and 1B are perspective views of a notebook PC having a housing of a portable information processor according to the present invention when the display portion is in the open state and in the closed state, respectively. FIG. 2A is another perspective view of the notebook PC when the display portion is in the closed state. FIGS. 2B and 2C are sectional views of the display portion of the notebook PC taken along axis 2B-2B and axis 2C-2C, respectively, of FIG. 2A.

As shown in FIGS. 1A-2C, the notebook PC has main body 11 and display portion 12 which are openable and closable relative to each other with hinge portion 13. Main body 11 includes the information processing unit of the notebook PC, and display portion 12 includes the liquid crystal display device of the notebook PC. The liquid crystal display device includes a liquid crystal drive circuit (unillustrated) and liquid crystal display panel 16 disposed between rear housing 14 and front housing 15 that compose the outer housing of the portable information processor.

The information processing unit with a CPU (unillustrated) to perform calculation functions retrieves necessary data and processes the data using the calculation functions. The processed data are transmitted to the liquid crystal display device where the processed data are displayed on the screen. Data is generally entered through keyboard or mouse, and processed data is displayed in text or graphic form on liquid crystal display panel 16. The CPU can perform useful calculation functions with various kinds of application software.

The following is a description of rear housing 14 of the notebook PC thus structured.

In FIG. 2A, non-raised portion 18 is formed to be a cylindrically curved surface in the width direction (axis 2C-2C) of rear housing 14 as shown by the solid arrows of FIGS. 2A and 2C. In other words, the level difference between raised portion 17 and non-raised portion 18 has edge line 19 substantially perpendicular to the lateral line (equal to axis 2B-2B of FIG. 2A) of the cylindrically curved surface of non-raised portion 18.

This structure allows rear housing 14 to have an improved bending strength in its longitudinal direction while maintaining the bending strength in its width direction.

Note that the cylindrically curved surface is shown in an exaggerated form in FIGS. 2A and 2C; however, the actual curvature is almost too small to visually comprehend.

In the case where the rear housing is press formed, even in the event of material distortion or distortion caused by the excess portion of the surface due to too much thermal expansion, the excess portion is deformed in such a manner as to make the flat surface of non-raised portion 18 much lower than raised portion 17. Consequently, the flat portion of non-raised portion 18 is never deformed in the protruding direction and ensured to be deformed in the depressing direction. Furthermore, the surface of non-raised portion 18 can maintain its tension and improve its strength against external forces unlike the conventional non-raised portion with a non-curved surface.

Also in the case of casting, the surface of non-raised portion 18 is ensured to be deformed in the depressing direction with no distortion while it is cooled and shrunk.

As described hereinbefore, according to rear housing 14 covering the display portion of the notebook PC of the present embodiment, the use of the thin planar material having the partially raised surface allows rear housing 14 to be more resistant to bending deformation due to external pressure not only in its width direction (axis 2C-2C of FIG. 2A) but also in its longitudinal direction (axis 2B-2B of FIG. 2A).

It can also prevent the surface of the raised portion from having irregularities due to material distortion or thermal expansion during press forming or cooling shrinkage during casting.

Figure 3A:
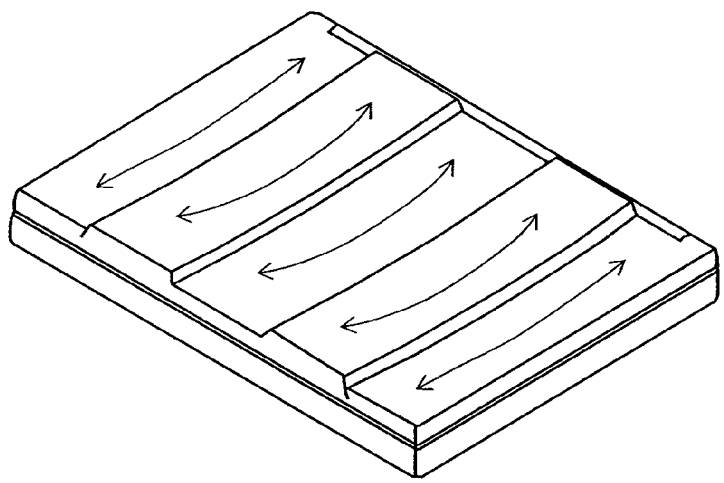
FIG. 3A is a perspective view of a notebook PC having another housing of the portable information processor according to the present invention when the display portion is in the closed state.
Figure 3B:
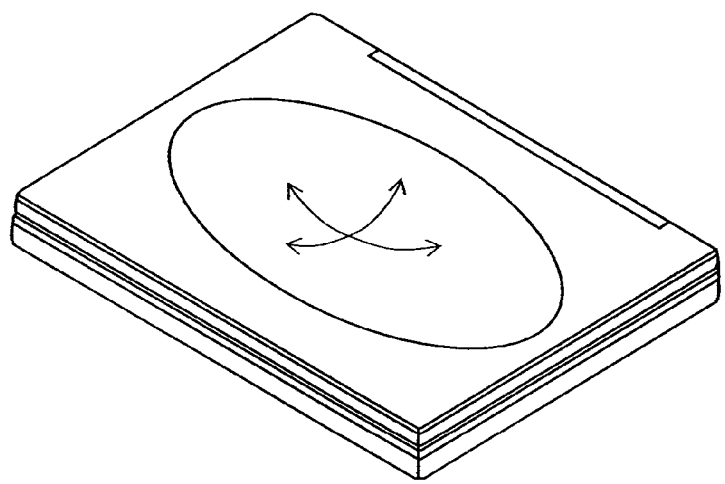
FIG. 3B is a perspective view of a notebook PC having another housing of the portable information processor according to the present invention when the display portion is in the closed state.
Figure 3C:
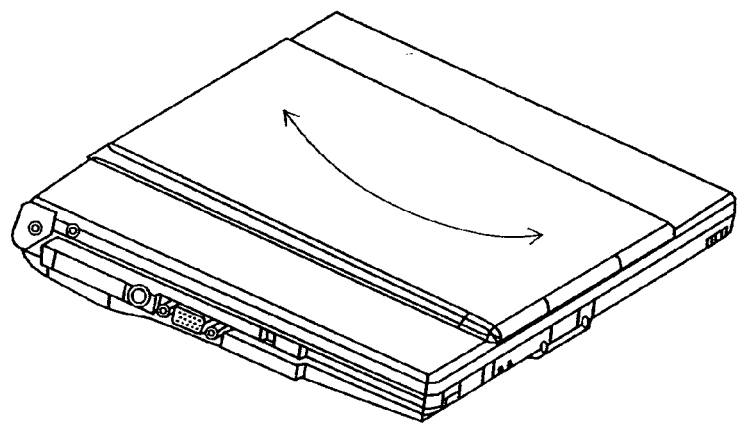
FIG. 3C is a perspective view of a notebook PC having another housing of the portable information processor according to the present invention when the display portion is in the closed state.
Figure 4A:
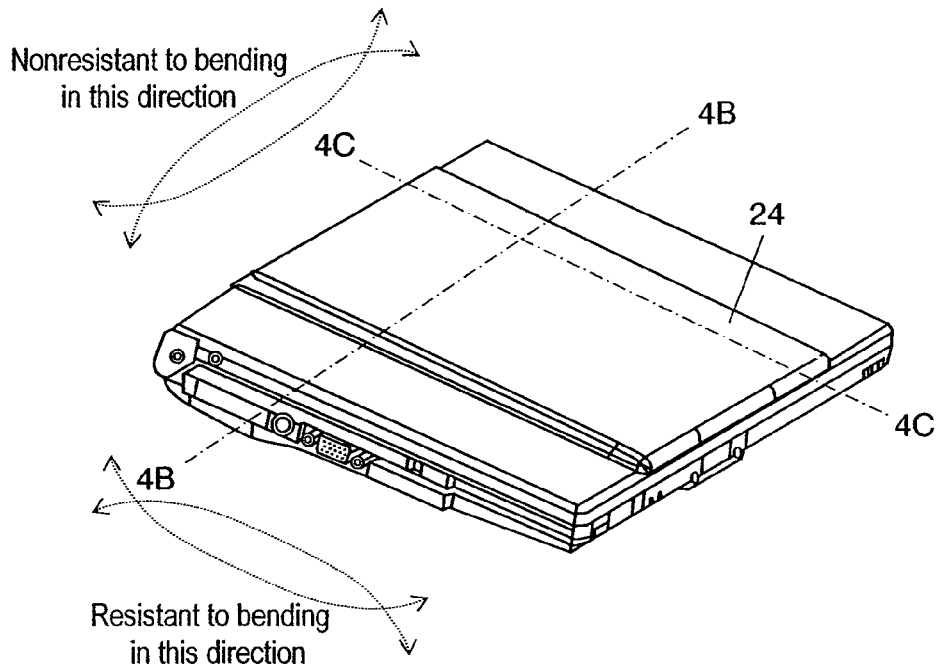
FIG. 4A is an external perspective view of a conventional notebook PC when the display portion is in the closed state.
Figure 4B:
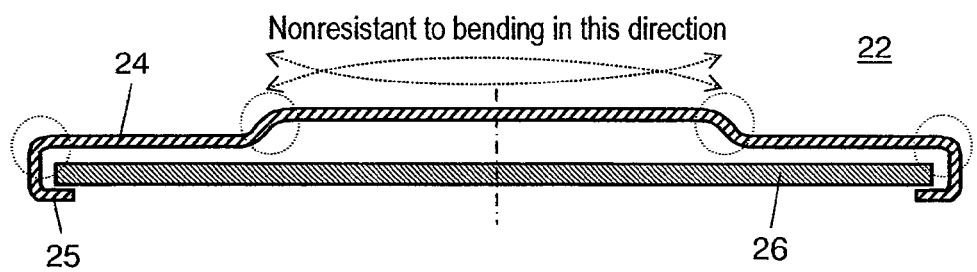
FIG. 4B is a sectional view of the display portion of the notebook PC taken along axis 4B-4B shown in FIG. 4A.
Figure 4C:
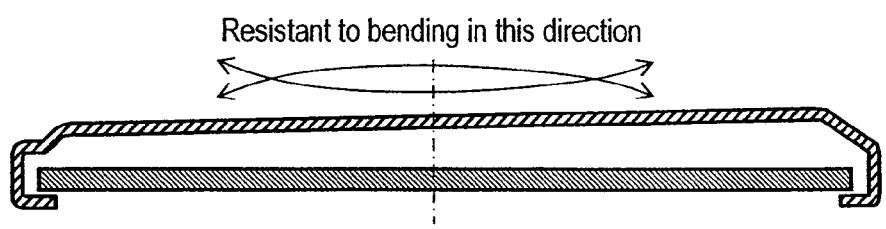
FIG. 4C is a sectional view of the display portion of the notebook PC taken along axis 4C-4C shown in FIG. 4A.
Figure 5:
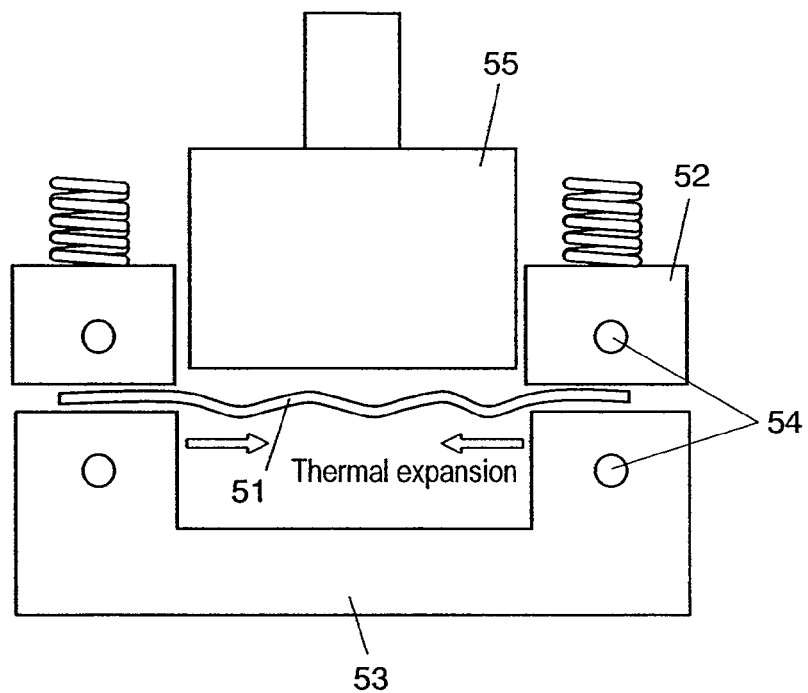
FIG. 5 shows a method for manufacturing a rear housing by press forming.
Figure 6:
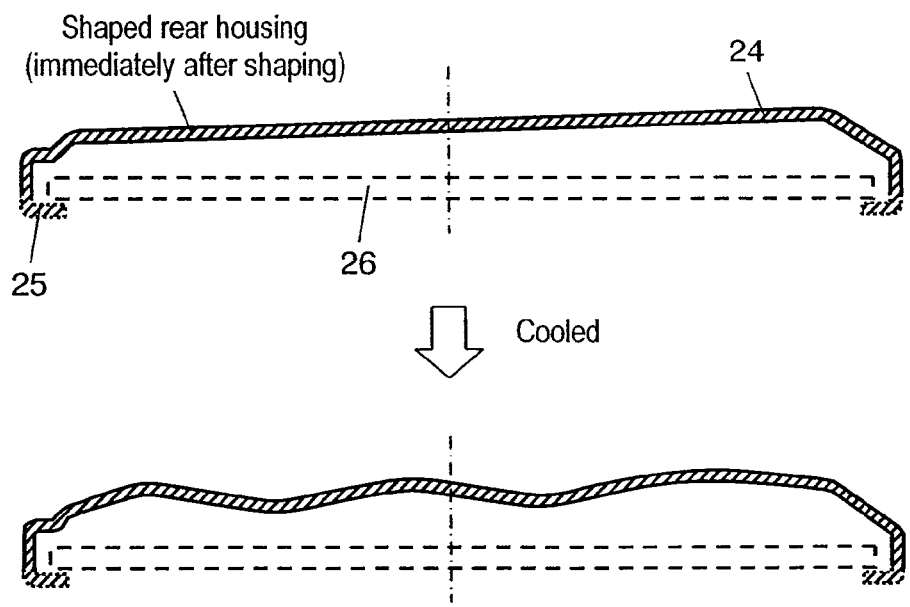
FIG. 6 shows a process where a rear housing shaped by casting is cooled and shrunk.

Rear housing 14 may be alternatively shaped as shown in FIGS. 3A to 3C to produce the same effects.

In the case of FIG. 3A, the raised portion as well as the non-raised portion is inwardly cylindrically curved into the housing as shown by the solid arrows. This structure allows the rear housing to be more resistant to deformation in its longitudinal direction. As a result, the surface of the raised portion can maintain its tension and improve its strength without having irregularities due to material distortion or thermal expansion during press forming or cooling shrinkage during casting. The surfaces divided by the raised and non-raised portions may have the same curvature.

Also in the case shown in FIG. 3B, the rear housing, which is spherically curved inward with the center portion at the top, produces the same effects.

Also in the case shown in FIG. 3C, the raised portion is inwardly cylindrically curved as shown by the solid arrow to produce the same effects.

In FIGS. 3A-3C, the curved surfaces of the rear housing are shown in an exaggerated form; however, the actual curvature is almost too small to visually comprehend.

Although the outer housing is made of a magnesium alloy in the present embodiment, it is alternatively possible to use an aluminum alloy or any other thin planar metallic material.

According to the housing of the portable information processor of the present invention, the rear housing can be prevented from being deformed in its width direction due to external pressure by having the automobile hood structure with a partially raised surface. The rear housing, which has become more resistant to deformation in its longitudinal direction, is useful as the housing of a portable information processor.

What is claimed is:

1. A housing of a portable information processor comprising a display portion and a main body, the display portion comprising:
    a rear housing including a raised portion and a non-raised portion separated by an edge line, the edge line extending in a first direction, at least one of the raised portion and the non-raised portion having an arcuate surface extending in the first direction from a first edge to a second edge opposite the first edge.

2. The housing of the portable information processor of claim 1, wherein
    the arcuate surface of the at least one of the raised portion and the non-raised portion is curved inwardly into the rear housing.

3. A housing of a portable information processor comprising a display portion and a main body, the display portion comprising:
    a rear housing including a flat portion and a curved portion separated by an edge line, the edge line having an elliptical shape, a center of the curved portion concentric with a center of the rear housing.

4. The housing of the portable information processor of claim 3, wherein
    the curved portion of the rear housing is bowed inward into the rear housing.

5. A method for manufacturing a housing comprising:
    fixing a planar metallic material; and
    shaping a rear housing including a raised portion and a non-raised portion by pressing the planar metallic material so as to create an edge line separating the raised portion and the non-raised portion, the edge line extending in a first direction, wherein
    at least one of the raised portion and the non-raised portion has an arcuate surface extending in the first direction from a first edge to a second edge opposite the first edge.

6. The method for manufacturing a housing of claim 5, wherein
    the arcuate surface of the at least one of the raised portion and the non-raised portion is curved inwardly into the rear housing.

7. The method for manufacturing a housing of claim 5, wherein
    the planar metallic material is a magnesium alloy.

8. A portable information processor comprising:
    a display portion including a liquid crystal display device having a liquid crystal display panel;
    a main body attached to be rotatable with the display portion, the main body including an information processing unit connected to the display portion; and
    an outer housing including a rear housing that comprises a surface of the display portion, the surface being opposite to an other surface of the display portion on which the liquid crystal display panel is disposed, wherein
    the rear housing includes a raised portion and a non-raised portion separated by an edge line, the edge line extending in a first direction, and at least one of the raised portion and the non-raised portion having an arcuate surface extending in the first direction from a first edge to a second edge opposite the first edge.

9. A portable information processor comprising:
    a display portion including a liquid crystal display device having a liquid crystal display panel;
    a main body attached to be rotatable with the display portion, the main body including an information processing unit connected to the display portion; and
    an outer housing including a rear housing that comprises a surface of the display portion, wherein
    the surface is opposite to an other surface of the display portion on which the liquid crystal display panel is disposed, and the rear housing includes a flat portion and a curved portion separated by an edge line, with the edge line having an elliptical shape, a center of the curved portion concentric with a center of the rear housing.

* * * * *